United States Patent [19]
Ulrich

[11] 3,916,298
[45] Oct. 28, 1975

[54] SYSTEM UTILIZING GALVANIC POTENTIALS FOR DETECTING BURIED CONDUCTIVE STRUCTURES

[75] Inventor: Donald E. Ulrich, Knoxville Deerfield Township, Tioga County, Pa.

[73] Assignee: Allison E. Scott, Troupsburg, N.Y.; a part interest

[22] Filed: July 11, 1973

[21] Appl. No.: 378,148

[52] U.S. Cl. .................. 324/3; 37/DIG. 19; 324/9; 324/67; 340/421
[51] Int. Cl.$^2$ ...................... G01V 3/08; E02F 9/26
[58] Field of Search ............... 324/1, 3, 9, 29.5, 65, 324/67, 72.5, 29, 72; 37/DIG. 19, 86; 340/421; 317/18

[56] References Cited
UNITED STATES PATENTS

| | | | |
|---|---|---|---|
| 1,850,412 | 3/1932 | Pavlik | 37/86 |
| 1,910,021 | 5/1933 | Legg | 324/65 |
| 2,214,786 | 9/1940 | Bishop | 324/9 X |
| 2,344,672 | 3/1944 | Blasier | 324/67 X |
| 2,974,276 | 3/1961 | Davis | 324/9 X |
| 3,735,249 | 5/1973 | Stoll | 324/9 |

FOREIGN PATENTS OR APPLICATIONS 600,640   7/1934   Germany .............................. 324/1

OTHER PUBLICATIONS

Scott, Gordon N. An Analysis of Certain Circuits in Cathodic Protection, Api Paper presented Nov. 11, 1942 pp. 1–12.

Primary Examiner—Gerard R. Strecker
Attorney, Agent, or Firm—Martin Lu Kacher, Esq.

[57] ABSTRACT

A system is described for detecting underground electrically conductive structures such as pipelines which are likely to be contacted during excavation, but without the need for any external electrical connections with the buried structure. A reference electrode and the excavating machine establish a galvanic circuit which uses the earth as the electrolyte and in which current is monitored. The current in this circuit changes abruptly when contact is made with the buried structure. An electronic switch is operated in response to this abrupt current change and operates a warning device or otherwise controls the actuating machine such that damage to the buried structure may be prevented.

13 Claims, 3 Drawing Figures

U.S. Patent  Oct. 28, 1975  3,916,298
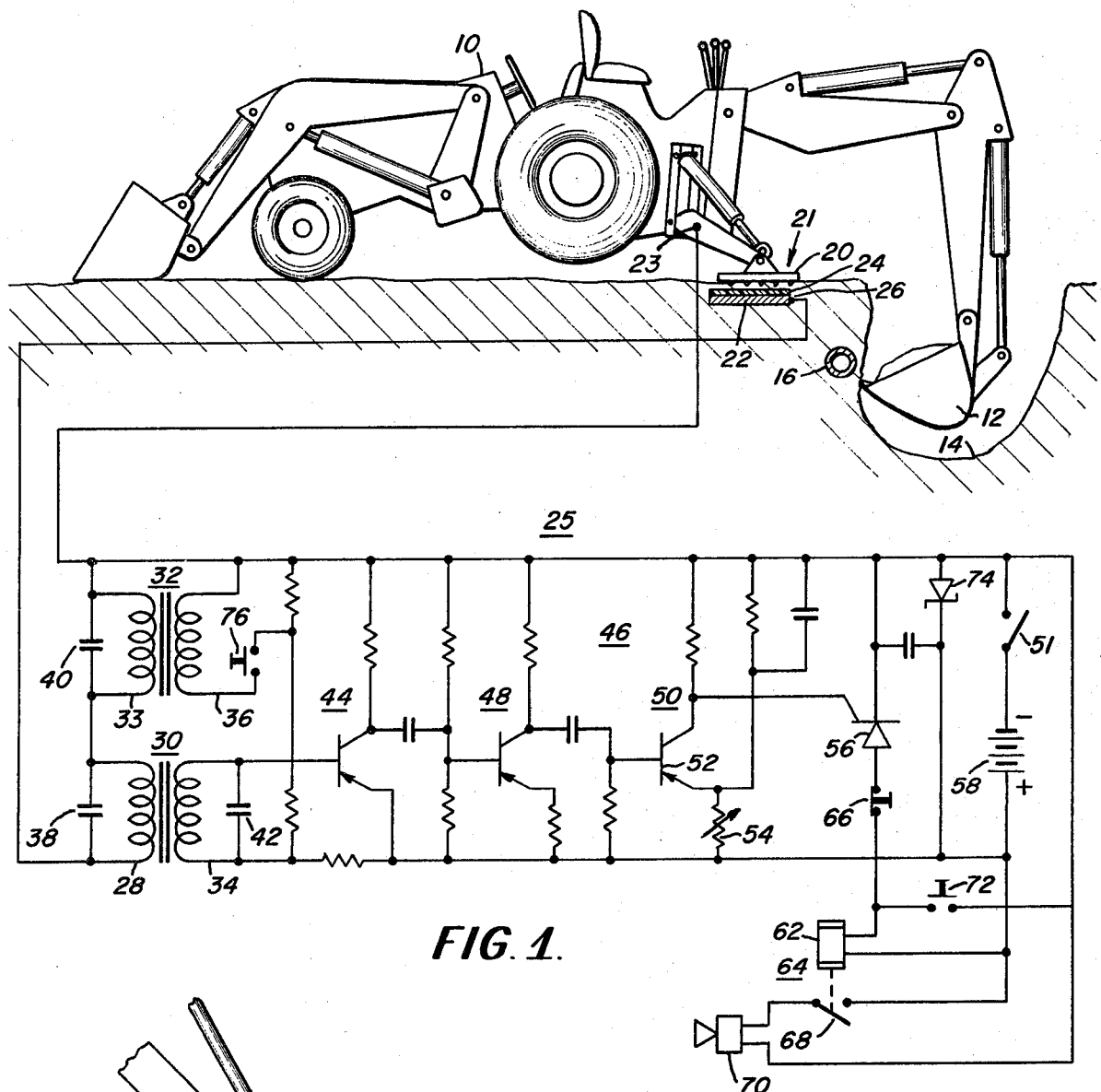
FIG. 1.
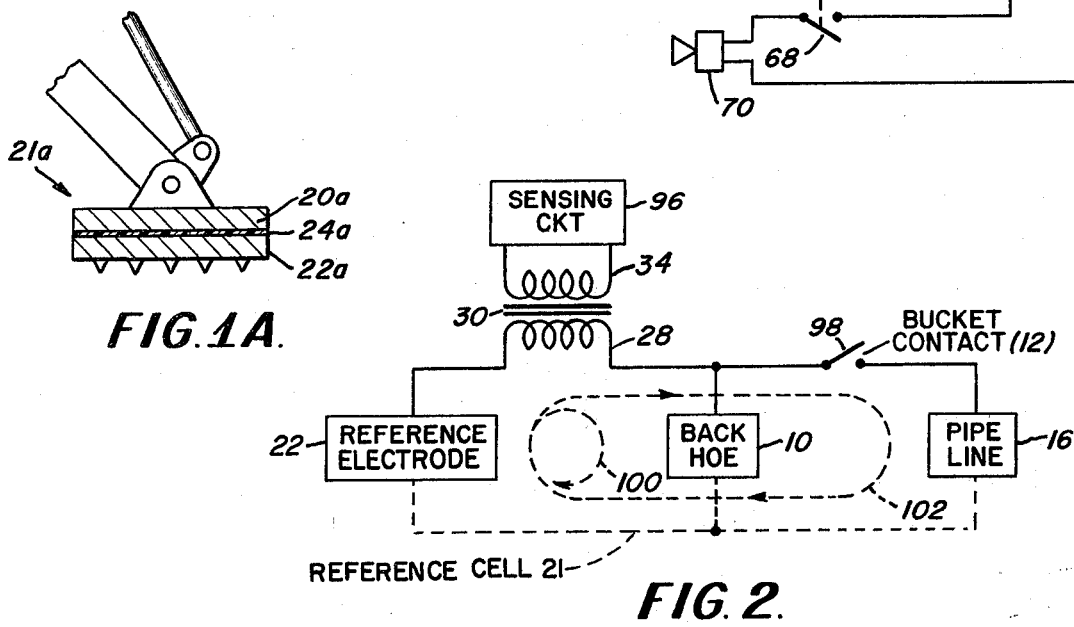
FIG. 1A.
FIG. 2.

SYSTEM UTILIZING GALVANIC POTENTIALS FOR DETECTING BURIED CONDUCTIVE STRUCTURES

The present invention relates to a system for detecting buried electrically conductive objects and structures and particularly to a system for finding and otherwise preventing damage to buried structures such as underground utility lines.

The invention is especially suitable for use in connection with excavating machines for warning the operator of such machines or stopping their operation when contact is made with buried metallic piping systems during excavation. The invention is also applicable whenever it is desired to detect or find buried conductive structures.

One of the major operating problems in construction is damage to buried utility lines such as gas and oil pipe lines and water mains during excavation. An uprooted gas line can cause explosions both in the excavation and nearby buildings. Even with the promulgation of laws requiring utility companies to mark and make available maps of their buried lines, there is a risk that some lines will not be marked or operators will inadvertently uproot or rupture even those lines which are marked. The seriousness of the problem is reflected by numerous records of deaths and injuries due to lines broken in construction (see Engineering News Record, December 21, 1972, page 25).

The foregoing problems have not gone unnoticed and many systems have been proposed for safeguarding excavating machinery against damaging metallic piping systems which might be contacted during excavation. These systems typically require contact to the buried lines or at least to a riser which is connected to the line (see U.S. Pat. Nos. 1,850,412; 2,131,291; 2,561,152; 3,190,476; 3,648,282). All buried lines are not available at the surface. This is especially true in the case of transmission gas and oil pipe lines which may go for miles without surfacing. Moreover, under present regulations gas and oil pipe lines must be electrically insulated, thus it is not possible to provide a connection to any water lines in the area and have any assurance that there will be a connection to a buried gas or oil pipe line.

The foregoing is especially true where cathodic protection devices are utilized. Such devices operate with insulated lines. Of course, the most serious chance of damaging a buried line occurs when that line is not expected to be found in the vicinity. In such cases excavation operations may be carried on without hook-up to the line, with the possibility of damaging any lines which come in contact with the excavating machine.

Other systems which have been proposed for protecting electrically operated power tools when they contact buried conductive objects, such as power lines, either require alternating current circuits which are not available at the excavating machine, or interpose electrical hazzards in construction equipment (see U.S. Pat. Nos. 3,340,433 and 3,386,004) or depend upon detection of electrical parameters which vary to an extent that their use is impractical at construction sites (see U.S. Pat. Nos. 3,171,062 and 3,528,004).

Accordingly, it is an object of the present invention to provide an improved system for detecting buried electrically conductive objects.

It is a further object of the present invention to provide an improved system for detecting buried underground metallic structures such as utility lines (e.g., gas, oil and water pipelines).

It is a still further object of the present invention to provide an improved system for reducing the danger of rupturing buried pipe lines when excavating.

It is a still further object of the present invention to provide an improved system for detecting buried lines which operates independently of the lines by not requiring electrical hook-up thereto.

It is a still further object of the present invention to provide an improved system for detecting buried lines which are themselves electrically insulated.

It is a still further object of the present invention to provide an improved system for detecting buried lines in spite of their being equipped with cathodic protection devices.

It has been discovered, in accordance with the present invention, that existing galvanic potentials which are present in the ground where metallic structures are buried can be used to detect these structures in a manner independent of the structures. When an excavating machine such as a back hoe, or even a conductive probe, makes contact with the buried structure there is produced a change in a current due to these existing galvanic potentials. When the underground structure, say a pipeline, is under cathodic protection, the cathodic protection devices themselves generate potentials which are usable in the same manner as the existing galvanic potentials for the detection of these protected pipelines. The change in current is an abrupt or transient current. The current is monitored in a galvanic circuit, hereinafter called "the base circuit", which is established by a reference electrode and a base electrode and the earth between the reference and base electrodes. Means for monitoring the current is connected between the base electrode and the reference electrode and completes the base circuit. Circuit means, such as an electronic switch is provided in the current monitoring means which is responsive to this abrupt or transient current. The switch may be used to operate an alarm or control device for the excavating machine whenever contact is made with the buried conductive object. Thus, the danger of damage to the buried object is reduced with the consequent increase in safety of excavating operations.

The foregoing and other objects and advantages and features of the present invention as well as additional objects and advantages and features thereof will be more readily apparent from a reading of the following specification in connection with the accompanying drawing in which:

FIG. 1 is a schematic diagram of a buried metallic structure detection system as used with an excavating machine of the backhoe type;

FIG. 1A is a fragmentary sectional view of a back hoe stabilizer bar equipped with a reference electrode structure in accordance with another embodiment of the invention; and FIG. 2 is a block diagram which is useful in explaining the operation of the system shown in FIG. 1.

Referring more particularly to the drawing, there is schematically shown an excavating machine 10 of the back-hoe type with its bucket 12 disposed in a trench 14 in the ground. The teeth of the bucket are about to come into contact with a buried underground structure which is illustrated as a pipeline 16. The back-hoe 10 has its stabilizing shoes 20 disposed in extending position on the surface of the ground as is conventional when excavating operations are in progress. Making contact with the ground and spaced from the bottom of the shoe 20 is a conductive element which provides a reference electrode in the form of a plate 22 which is electrically insulated from the machine with an insulator 24. The excavating machine 10 which is in contact with the earth, and particularly the shoe 20 which is a part thereof, provides a base electrode. The shoe 20 and the plate 22 may be of essentially the same material, such as steel. Together, the reference electrode plate 22 and base electrode shoe 20 provide a galvanic reference cell 21 which uses the ground (viz., the earth) as an electrolyte. A terminal 23 is provided on the machine 10. This terminal is connected through the machine to the base electrode shoe 10. The plate reference electrode 22 has a terminal 26. Electrical circuit means 25 for monitoring the current due to the galvanic potentials generated by the cell is connected between the terminals 23 and 26. The circuit means 25 completes the base galvanic circuit which includes the cell 21. The path of this base circuit extends from the terminal 26 of the reference electrode plate 22, through the circuit means 25 by way of an input winding 28 of a transformer 30 and the input winding 33 of another transformer 32 back to the terminal 23 on the machine 10 which is connected to the base electrode shoe 20, and thence through the earth to the reference electrode plate 22. There is another galvanic circuit which is effectively connected to the base electrode shoe 20 through the machine 10 and its back hoe portion. This other circuit extends to the bucket 12 which may be considered to be a probe. This other circuit includes the pipe 16, when the pipe is contacted by the bucket 12. The other circuit extends from the bucket and pipe 16, when contacted by the bucket 12, through the earth to the reference electrode plate 22. These galvanic circuits will also be discussed hereinafter in connection with FIG. 2.

As shown in FIG. 1A, a reference electrode 22a may be provided as an integral part of the stabilizer shoe 20a. The insulator 24a separates the plate 22a from the shoe 20a.

So long as the bucket does not contact the pipe 16 the current in the base galvanic circuit will be essentially constant.

Once the bucket 12 strikes the pipe 16, there will an abrupt change or transient in the current monitored by the circuit means 25 in the base circuit due to inclusion of the other galvanic circuit in the base circuit containing the cell 21 which abrupt change in current will be induced through the transformers 30 and 32 into their secondary windings 34 and 36. It is preferred that the transformer 30 be a step-up transformer with the winding 34 having about 10 times as many turns as the winding 28. The transformer 32 is used for self test purposes as will presently appear. The capacitors 38 and 40 which are connected across the input windings 28 and 32 are used to bypass high frequency currents which may exist in the circuit path such that they do not effect the operation of the system. The capacitor 42 across the secondary winding 34 is provided for a similar purpose.

When an abrupt change or transient in the current occurs as upon the bucket 12 making even insipient contact with the pipe 16, the change in current through the primary or input winding 28 of the transformer 30 will induce a voltage across the secondary 34 of that transformer 30 which will be applied to the base electrode of the first stage 44 of a three-stage transistor amplifier 46. The first and second stages 44 and 48 of the amplifier 46 amplify the voltage appearing across the secondary 34 of the transformer 30.

The last stage 50 of the amplifier provides a threshold circuit. The bias between base and emitter of the transistor 52 of the stage 50 is adjusted by means of a potentiometer 54 such that the transistor 52 does not become conductive unless the voltage appearing at its base exceeds a threshold amplitude. When that amplitude is exceeded however, a triggering potential is applied to a silicon controlled rectifier (SCR) 56. Current from a battery 58, which may be the storage battery used in the machine 10, then flows through an ignition switch 51, the operating winding 62 of a relay 64, a reset switch 66, and the SCR. The relay 64 is then operated so as to apply voltage to its contact 68 to an alarm in the form of a horn 70 which may be the horn with which the machine 10 is equipped. The operator of the machine 10 then knows that he should cease operations and inspect for buried structures. In this way the pipeline 16 will be detected before it is uprooted. The relay 64 may also be used in the electrical or hydraulic system of the machine 10 so as to automatically stop machine operations. When the reset switch 66 is depressed, the SCR 56 is then rendered non-conductive and the relay 62 will drop out. The horn 70 then stops sounding its alarm. The horn 70 may be operated by another switch 72 which may be the normal horn control.

A zener diode 74 which is connected across the battery 58 and the ignition switch 51 provides voltage regulation for the circuit.

In order to calibrate the system and for self-test purposes, a push-button switch 76 is provided. This switch when actuated presents a transient voltage in the base emitter path of the transistor of the first stage 44. Before commencing operations the switch 76 may be depressed to insure that the system is in operating condition. Any adjustments of the threshold may then be made through the use of the potentiometer 54. It will be appreciated that either the existing horn and horn operating relay of the machine 10 may be used or a special horn and relay may be provided. In effect the amplifier 46 and the SCR circuit operate as an electronic switch for detecting the abrupt or transient changes in current due to the bucket 12 making contact with the pipe 16. It will be appreciated, of course, that the electronic switch circuit may be utilized independently of the machine 10, as with an independent conductive probe for detecting buried structures as when making a survey of an area to be excavated.

The operataion of the system may be more apparent from FIG. 2. In the absence of a bucket 12 to pipe line 16 contact (schematically illustrated as a switch 98), there is a quiescent steady state, DC galvanic current flow around the base galvanic circuit formed by the back hoe 10, the earth electrolyte and the reference electrode 22 (which establish the reference cell 21), and by the input winding 28 of the transformer which is shown as a loop 100. The cell polarity as shown may be reversed. When the switch 98 closes, the other circuit shown as another loop 102 is instantaneously inserted in the network; thus introducing a transient additional galvanic current which is detected by the sensing circuit 96 and used to sound the alarm.

If cathodic protection devices are used to protect the pipeline 16 the resultant potentials may be utilized in the same manner as galvanic potentials to produce a transient current when the pipeline 16 is contacted by the bucket 12.

From the foregoing description it will be apparent that there has been provided an improved system for the detection of buried conductive objects and structures. While the invention has been described in connected with and as applied to an excavating machine, it will be appreciated that the invention has other applications and that the herein described circuit is subject to modification and variation within the scope of the invention. Accordingly, the foregoing description should be taken merely as illustrative and not in any limiting sense.

What is claimed is:

1. A system for detecting electrically conductive structures which are buried in the earth, said system comprising;
    a. a reference electrode disposed in contact with the earth,
    b. a base electrode also disposed in contact with the earth, said base electrode being in proximity to said reference electrode and spaced therefrom so as to be out of contact therewith,
    c. current monitoring means connected between said base electrode and said reference electrode, said base electrode, reference electrode and current monitoring means establishing a base galvanic circuit which extends through the earth between said base electrode and said reference electrode,
    d. movable probe means connected to said base electrode and adapted to contact said buried conductive structures to establish another galvanic circuit when contact is made between said probe means and said buried conductive structures, said other circuit extending between said probe means in contact with said conductive structures and said reference electrode through the earth therebetween and then from said reference electrode through said current monitoring means back to said probe means, whereby the detection of said buried conductive structures is indicated by said current monitoring means when galvanic current therethrough changes abruptly upon contact of said probe means with said buried conductive structures.

2. The invention as set forth in claim 1 wherein said probe means is provided by the earth removing element of an excavating machine, said base electrode is provided by a conductive member on said machine disposed on the surface of the earth, and said reference electrode is provided by a second conductive member which is disposed in contact with the earth.

3. The invention as set forth in claim 2 wherein said second conductive member is disposed adjacent to said first conductive member.

4. The invention as set forth in claim 1 wherein said current monitoring means includes circuit element means providing a path for direct current therethrough, said circuit element means being connected between said reference electrode and said base electrode.

5. The invention as set forth in claim 4 wherein said circuit element means includes a transformer having an input winding connected between said reference electrode and said base electrode.

6. The invention as set forth in claim 5 wherein said circuit element means further comprises the output winding of said transformer and means responsive to the voltage across said output winding for providing an output signal.

7. The invention as set forth in claim 6 wherein said means responsive to the voltage across said output winding includes switch means operated by said output signal.

8. The invention as set forth in claim 7 wherein said circuit element means further comprises alarm means operated by said switch means.

9. The invention as set forth in claim 6 wherein said means responsive to the voltage across said transformer output winding includes an amplifier for providing said output signal and also threshold control means which are included in said amplifier for inhibiting said output signal unless that voltage is above a certain level.

10. The invention as set forth in claim 1 wherein said current monitoring means includes means responsive to abrupt changes in current therethrough for indicating the detection of said buried conductive structures.

11. The invention as set forth in claim 1 wherein said current monitoring means comprises an electronic switch having an input circuit connected between said reference electrode and said base electrode, said input circuit including means for operating said switch in response to a transient in the current through said input circuit.

12. The invention as set forth in claim 1 wherein said reference electrode is provided by a plate, said plate being disposed in the earth below a stabilizing shoe of an excavating machine, and an insulating member disposed between said plate and said shoe.

13. The invention as set forth in claim 12 wherein said shoe insulating member and plate are integral with each other.

* * * * *